United States Patent
Tung et al.

(10) Patent No.: US 11,777,765 B2
(45) Date of Patent: Oct. 3, 2023

(54) SIGNAL TRANSMISSION SYSTEM, TRANSMITTER ENCODING APPARATUS AND RECEIVER DECODING APPARATUS

(71) Applicant: Realtek Semiconductor Corporation, Hsinchu (TW)

(72) Inventors: Hsu-Jung Tung, Hsinchu (TW); Lien-Hsiang Sung, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 18/154,864

(22) Filed: Jan. 16, 2023

(65) Prior Publication Data

US 2023/0179453 A1    Jun. 8, 2023

Related U.S. Application Data

(63) Continuation of application No. 17/352,498, filed on Jun. 21, 2021, now Pat. No. 11,588,666.

(60) Provisional application No. 63/081,994, filed on Sep. 23, 2020.

(30) Foreign Application Priority Data

Feb. 8, 2021 (TW) .................................. 110104819

(51) Int. Cl.
*H04L 25/02* (2006.01)
*H04J 13/00* (2011.01)
*H04J 13/10* (2011.01)

(52) U.S. Cl.
CPC ...... *H04L 25/0272* (2013.01); *H04J 13/0011* (2013.01); *H04J 13/102* (2013.01)

(58) Field of Classification Search
CPC .................................................. H04L 25/4908
See application file for complete search history.

(56) References Cited

U.S. PATENT DOCUMENTS

| | | | |
|---|---|---|---|
| 7,729,389 B1 | 6/2010 | Lo | |
| 2005/0201488 A1 | 9/2005 | Duff et al. | |
| 2009/0323727 A1* | 12/2009 | Surek | H04J 3/1658 370/503 |
| 2010/0023711 A1* | 1/2010 | Thyagarajan | H04L 1/0042 711/E12.005 |
| 2012/0300792 A1* | 11/2012 | Patel | H04L 49/30 370/476 |
| 2014/0269954 A1 | 9/2014 | Whitby-Strevens | |

(Continued)

*Primary Examiner* — Kevin Kim
(74) *Attorney, Agent, or Firm* — CKC & Partners Co., LLC (57) ABSTRACT

A receiver decoding apparatus includes a first receiver decoder, a demultiplexer, a first receiver encoder and a second receiver decoder. The first receiver decoder decodes a plurality of N-bit code words received from a transmitter encoding apparatus to generate a plurality of I-bit code words, wherein N and I are both positive integers and N is not equal to I. The demultiplexer alternately deinterleaves and assigns the plurality of I-bit code words to a plurality of output terminals of the demultiplexer. The first receiver encoder encodes a plurality of outputs of the output terminals of the demultiplexer to a fifth digital signal comprising a plurality of J-bit code words and a sixth digital signal comprising a plurality of J-bit code words, wherein J is a positive integer and not equal to I. The second receiver decoder decodes the fifth digital signal and the sixth digital signal.

6 Claims, 7 Drawing Sheets

(56) References Cited

U.S. PATENT DOCUMENTS

2014/0340579 A1 11/2014 Choi et al.
2015/0036756 A1 2/2015 Choi et al.

* cited by examiner

Fig. 7

SIGNAL TRANSMISSION SYSTEM, TRANSMITTER ENCODING APPARATUS AND RECEIVER DECODING APPARATUS

CROSS-REFERENCE TO RELATED APPLICATIONS

The present application is a continuation of the U.S. application Ser. No. 17/352,498, filed Jun. 21, 2021, which claims priority to U.S. Provisional Application Ser. No. 63/081,994, filed Sep. 23, 2020, and Taiwan Application Serial Number 110104819, filed Feb. 8, 2021, all of which are herein incorporated by reference in their entireties.

BACKGROUND

Technical Field

The present disclosure relates to a signal transmission system and a transmitter encoding apparatus thereof. More particularly, the present disclosure relates to a DC-balance high-speed signal transmission system and a transmitter encoding apparatus thereof.

Description of Related Art

Differential signals produce steep rising and falling edges and provide good resistance to external interference, so that the differential signals are widely applied in high-speed data rate transmission technologies. When using the differential signals to transmit continuous sequences having multiple 1's or 0's, the impedance of the transmission line increases correspondingly due to the signal frequency reduction, which may to attenuate and distort the signals in transmission. In order to establish a balanced transmission of the sequence of 1's and 0's (i.e., to achieve DC-balance) with differential signals, many encoding methods have been applied to high-speed data rate transmission systems, such as 8-bit to 10-bit (8B/10B) encoding method. In this encoding method, each 8-bit code word is converted into a 10-bit code word with positive disparity, negative disparity or neutral disparity. The positive disparity means that the number of 1's in the sequence is more than that of 0's. The negative disparity means that the number of 1's in the sequence is less than that of 0's. The neutral disparity means that the numbers of 1's and 0's in the sequence are equal. By properly arranging the order of appearance of the 10-bit code words with these three types of disparities, DC-balance can be achieved.

SUMMARY

The disclosure provides a signal transmission system, which includes a transmitter encoding apparatus and a receiver decoding apparatus. The transmitter encoding apparatus includes a multiplexer and a first transmitter encoder. The multiplexer is configured to receive a first digital signal and a second digital signal and generate an output. The output of the multiplexer includes multiple M-bit code words of the first digital signal and multiple M-bit code words of the second digital signal, wherein the multiple M-bit code words of the first digital signal and the multiple M-bit code words of the second digital signal are arranged in an interleaved manner, and M is a positive integer. The first transmitter encoder is configured to encode the output of the multiplexer to generate multiple N-bit code words. N is a positive integer and N is not equal to M. The first transmitter encoder is configured to determine a current N-bit code word of the multiple N-bit code words according to the output of the multiplexer and a disparity of a previous N-bit code word of the multiple N-bit code words. The receiver decoding apparatus is coupled to the transmitter encoding apparatus, and includes a first receiver decoder and a demultiplexer. The first receiver decoder is configured to decode the multiple N-bit words to generate multiple I-bit code words. I is a positive integer and I is not equal to N. The demultiplexer is configured to alternately deinterleave and assign the multiple I-bit code words to the multiple output terminals of the demultiplexer.

The disclosure provides a transmitter encoding apparatus, which includes a multiplexer and a first transmitter encoder. The multiplexer is configured to receive a first digital signal and a second signal and generate an output, in which the output includes multiple M-bit code words of the first digital signal and multiple M-bit code words of the second digital signal, wherein the multiple M-bit code words of the first digital signal and the multiple M-bit code words of the second digital signal are arranged in an interleaved manner, and M is a positive integer. The first transmitter encoder is configured to receive the output of the multiplexer to generate multiple N-bit code words, in which N is a positive integer and N is not equal to M. The first transmitter encoder is configured to determine a current N-bit code word of the multiple N-bit code words according to the output of the multiplexer and a disparity of a previous N-bit code word of the multiple N-bit code words. The first transmitter encoder is configured to transmit the multiple N-bit code words to a receiver decoding apparatus including a demultiplexer and a first receiver decoder configured to decode the multiple N-bit code words.

The disclosure provides a receiver decoding apparatus, which includes a first receiver decoder and a demultiplexer. The first receiver decoder is configured to decode multiple N-bit code words to generate multiple I-bit code words, in which the multiple N-bit code words have substantially identical numbers of ones and zeros, in which N and I are both positive integers and N is not equal to I. The demultiplexer is configured to alternately deinterleave and assign the multiple I-bit code words to the output terminals of the demultiplexer, in which the first receiver decoder is configured to receive the multiple N-bit code words from a transmitter encoding apparatus including a multiplexer and a first transmitter encoder configured to generate the multiple N-bit code words.

The advantages of these embodiments are that the number of transmission lines can be reduced in the case that the data rate is not reduced.

It is to be understood that both the foregoing general description and the following detailed description are by examples, and are intended to provide further explanation of the disclosure as claimed.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
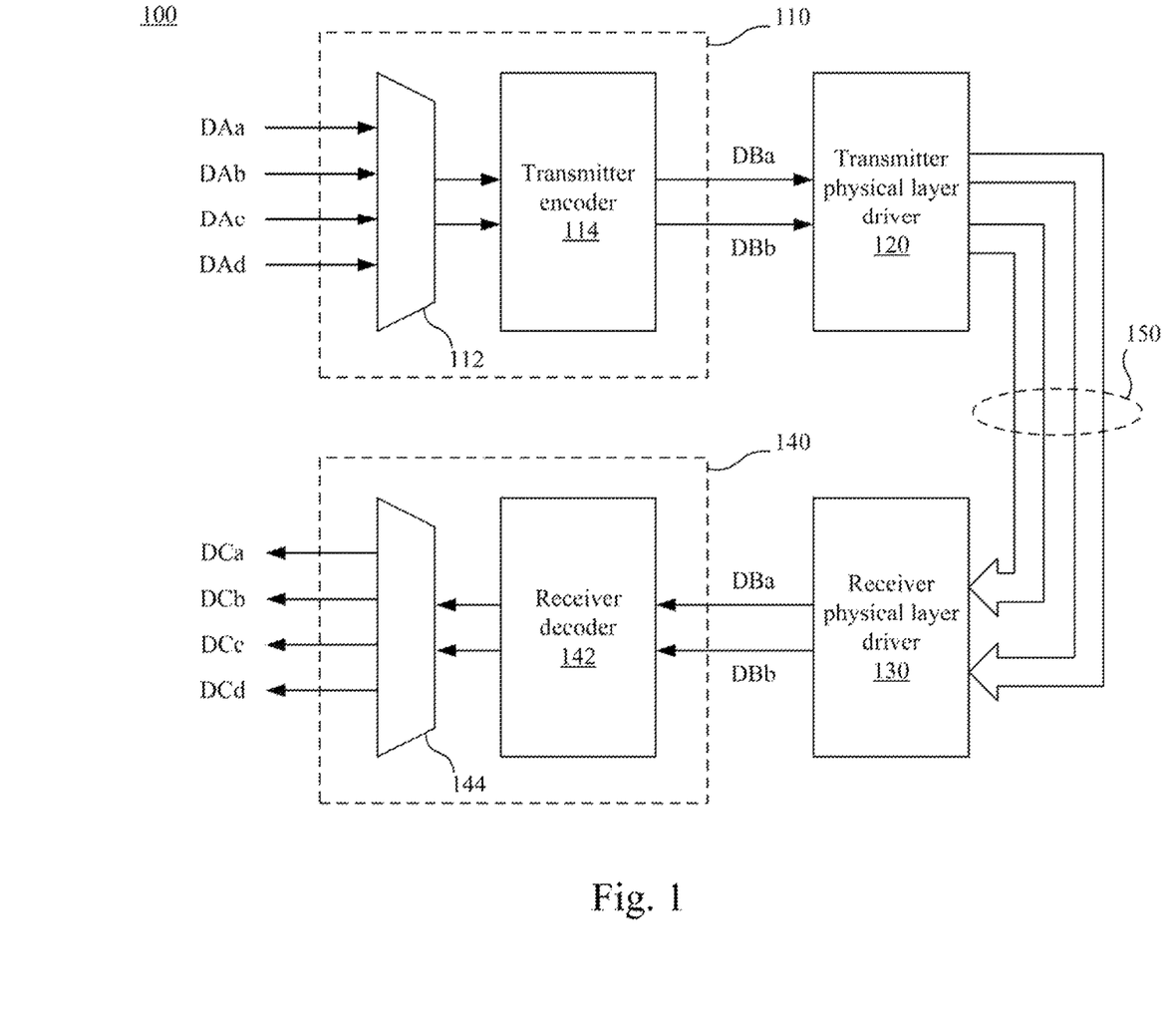
FIG. 1 is a simplified functional block diagram of a signal transmission system according to one embodiment of the present disclosure.

FIG. 1 is a simplified functional block diagram of a signal transmission system 100 according to one embodiment of the present disclosure. The signal transmission system 100 comprises a transmitter encoding apparatus 110, a transmitter physical layer driver 120, a receiver physical layer driver 130, a receiver decoder apparatus 140 and a cable 150. The transmitter encoding apparatus 110 is configured to receive a plurality of digital signals DAa-DAd transmitted from external apparatuses (not shown, e.g., a graphics processing unit or other appropriate logic circuits). In some embodiments, the digital signals DAa-DAd include video data, audio data, or other control signals (e.g., including but not limited to the vertical synchronous signal and the backlight control signal). The transmitter encoding apparatus 110 is configured to encode the digital signals DAa-DAd into the digital signals DBa-DBb, and configured to supply the digital signals DBa-DBb to the transmitter physical layer driver 120. In some embodiments, the digital signals DBa-DBb are DC-balance signals.

The transmitter physical layer driver 120, the cable 150 and the receiver physical layer driver 130 are sequentially coupled in series. The transmitter physical layer driver 120 is configured to convert the digital signals DBa-DBb to serialized differential signals and to transmit the serialized differential signals to the receiver physical layer driver 130 by cable 150. That is, although the cable 150 of FIG. 1 is depicted as dual channels, the cable 150 may comprise 4 differential signal lines in some embodiments. The receiver physical layer driver 130 is configured to recover the differential signals to the digital signals DBa-DBb and to provide the digital signals DBa-DBb to the receiver decoder apparatus 140. The receiver decoder apparatus 140 is configured to couple to a video control IC or audio control IC (not shown). The receiver decoder apparatus 140 is also configured to convert the digital signals DBa-DBb into a data format compatible with the video control IC or the audio control IC so as to generate digital signals DCa-DCd. In some embodiments, the transmitter physical layer driver 120, the cable 150, and the receiver physical layer driver 130 comply with or is compatible with one or more communication standards, for example but not limited to peripheral component interconnect express (PCIe), serial advanced technology attachment (SATA) or high definition multimedia interface (HDMI).

The transmitter encoding apparatus 110 comprises a multiplexer 112 and a transmitter encoder 114 coupled to each other. The multiplexer 112 is configured to receive the digital signals DAa-DAd. For better understandings, in the following embodiments of the present disclosure, the digital signals DAa-DAd are assumed to each contain a plurality of 8-bit code words, but the present disclosure is not limited thereto. In some embodiments, the digital signals DAa-DAd each contain a plurality of M-bit code words, and M is a positive integer. A first output terminal of the multiplexer 112 is configured to output the 8-bit code words of the digital signals DAa and DAb, and the multiplexer 112 interleaves the 8-bit code words of the digital signal DAa with the 8-bit code words of the digital signal DAb. In a similar way, a second output terminal of the multiplexer 112 is configured to output the 8-bit code words of the digital signals DAc and DAd, and the multiplexer 112 interleaves the 8-bit code words of the digital signal DAc with the 8-bit code words of the digital signal DAd.

Figure 2:
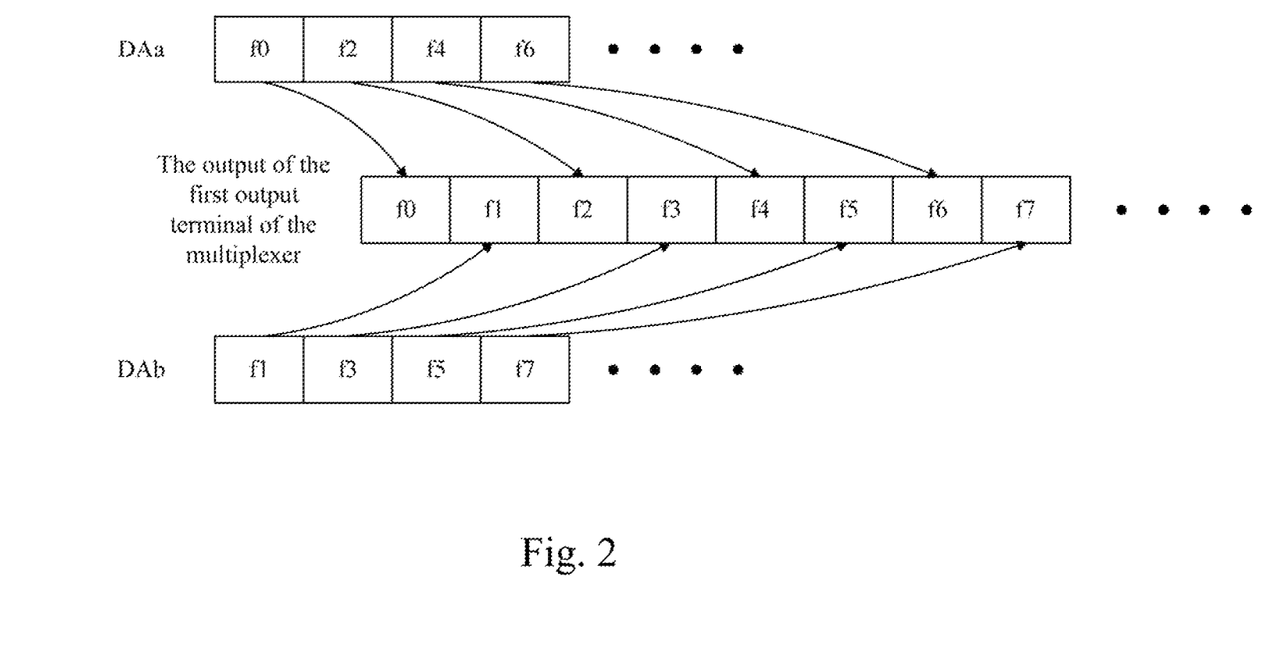
FIG. 2 is a schematic diagram illustrating an operation, executed by a multiplexer, of alternately interleaving code words of different digital signals.

FIG. 2 is a schematic diagram illustrating an operation, executed by the multiplexer 112, of alternately interleaving code words of different digital signals. As shown in FIG. 2, in an arbitrary period of time, the digital signal DAa provides code words "f0," "f2," "f4" and "f6" in sequence, and the digital signal DAb provides code words "f1," "f3," "f5" and "f7" in sequence. In an output of the first output terminal of the multiplexer 112, the code word "f1" is arranged between the code words "f0" and "f2" and the code word "f3" is arranged between the code words "f2" and "f4," and so on. In the present disclosure, the code word is expressed in hexadecimal form to simplify the descriptions. For example, the code word "f0" in hexadecimal form is equivalent to the 8-bit code word "11110000" in binary form. The multiplexer 112 interleaves the code words of the digital signals DAc and DAd in a similar way. For the sake of brevity, those descriptions are omitted.

The transmitter encoder 114 is configured to encode the 8-bit code words, received from the first and the second output terminal of the multiplexer 112, into 10-bit code words, so as to obtain the digital signals DBa and DBb respectively. That is, the transmitter encoder 114 is an 8-bit to 10-bit (8B/10B) encoder, but the present disclosure is not limited thereto. In some embodiments, the transmitter encoder 114 is configured to encode M-bit code words outputted by the multiplexer 112 to the digital signals DBa and DBb having N-bit code words, in which N is a positive integer and N is not equal to M.

Figure 3:
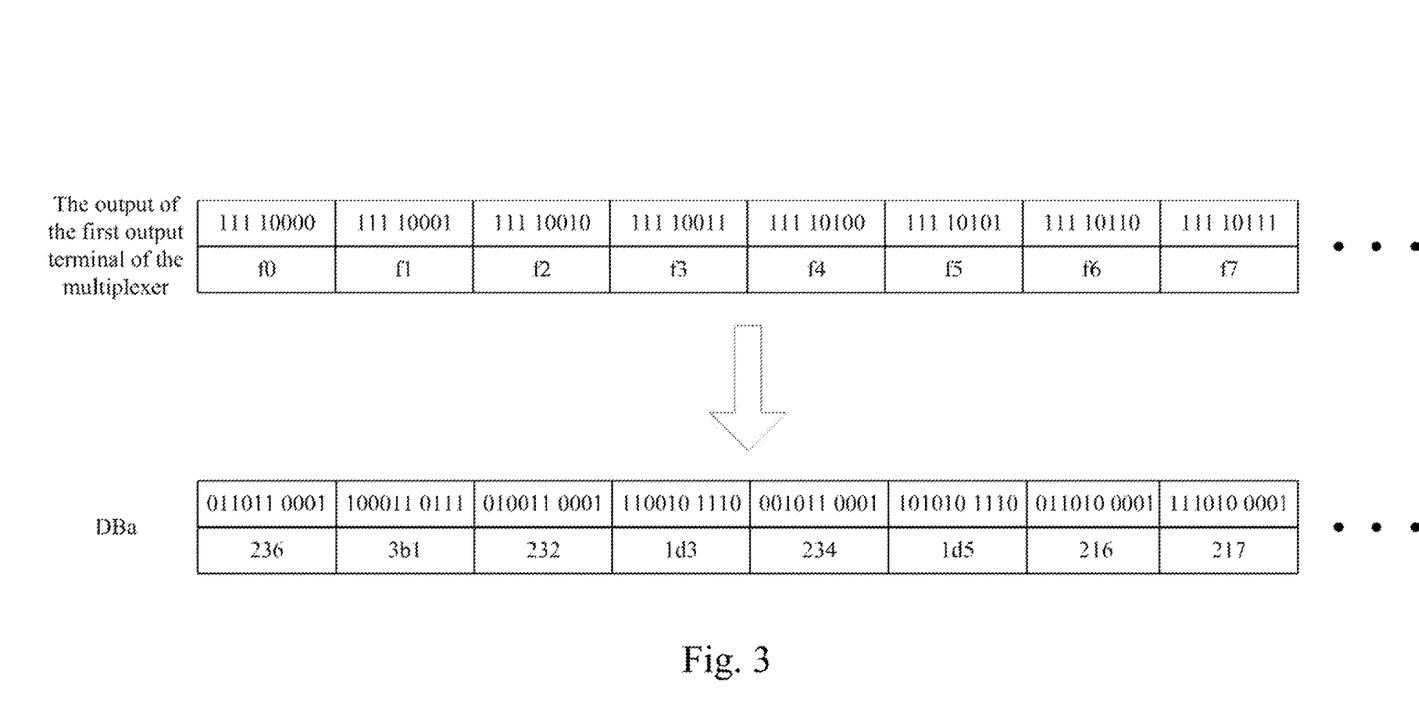
FIG. 3 is a schematic diagram of a coding result of the transmitter encoder.

FIG. 3 is a schematic diagram of the encoding result of the transmitter encoder 114. As shown in FIG. 3, the transmitter encoder 114 encodes the 8-bit code words "f0~f7" to 10-bit code words "236," "3b1," "232," "1d3," "234," "1d5," "216" and "217" to generate the digital signal DBa. The 8B/10B encoding method is well-known to a person having ordinary skill in the art, and thus those descriptions are omitted for the sake of brevity.

It is to be noted that, among the code words of the digital signal DBa outputted by the transmitter encoder 114, if an arbitrary code word has a positive disparity, another code word adjacent to that code word has a negative disparity. For example, the code word "3b1" has more 1's than 0's (6 ones and 4 zeros in total) so it corresponds to a positive disparity, which causes the next code word "232" has less 1's than 0's (4 ones and 6 zeros in total) so it corresponds to a negative disparity. Similarly, if an arbitrary code word has the negative disparity, another arbitrary code word with the positive disparity is adjacent to that arbitrary code word with the negative disparity. For example, the code word "234" has the negative disparity so that the next code word "1d5" has the positive disparity.

As mentioned above, the transmitter encoder 114 determines a current code word of the digital signal DBa according to the output (e.g., the code word "f2") of the multiplexer 112 and a disparity of a previous code word of the digital signal DBa (e.g., the positive disparity of the code word "3b1"). In this way, the digital signal DBa is a DC-balance signal, that is, the code words of the digital signal DBa have substantially identical numbers of 1's and 0's. The transmitter encoder 114 encodes the output of the second output terminal of the multiplexer 112 to the DC-balance digital signal DBb according to a similar method to the above, and thus those descriptions are omitted for the sake of brevity.

Reference is made again to FIG. 1. The receiver decoder apparatus 140 comprises a receiver decoder 142 and a demultiplexer 144 coupled to each other. The receiver decoder 142 is configured to receive the digital signals DBa and DBb from the receiver physical layer driver 130. The receiver decoder 142 decodes the 10-bit code words of the digital signals DBa and DBb to 8-bit code words, and provides the 8-bit code words of the digital signals DBa and DBb to the first and the second input terminals of the demultiplexer 144 respectively. The demultiplexer 144 further comprises the first through the fourth output terminals. The demultiplexer 144 is configured to alternately assign the code words, received by the first input terminals thereof, to the first and the second output terminals of the demultiplexer 144, so as to form the digital signals DCa and DCb respectively. Similarly, the demultiplexer 144 alternately assigns the code words received by the second input terminals thereof, to the third and the fourth output terminals of the demultiplexer 144, so as to form the digital signals DCc and DCd respectively.

Figure 4:
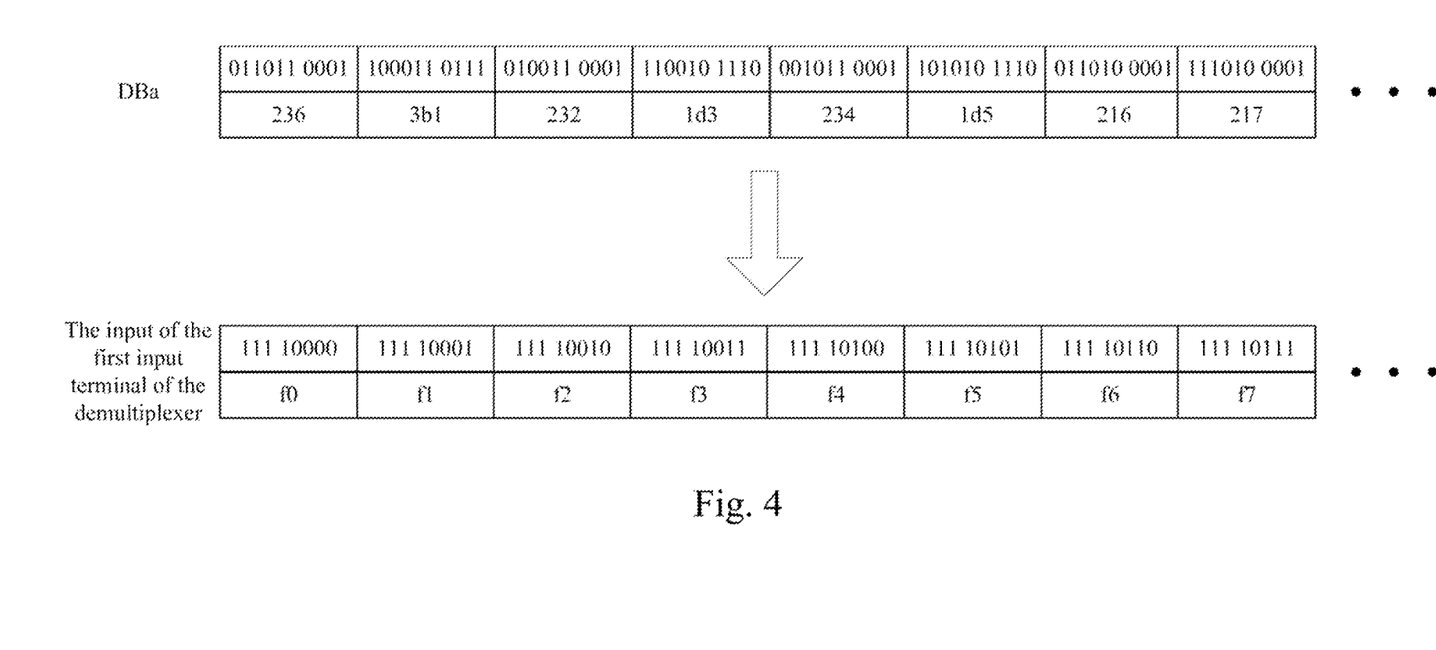
FIG. 4 is a schematic diagram of a decoding result of the receiver decoder.

FIG. 4 is a schematic diagram of the decoding result of the receiver decoder 142. As shown in FIG. 4, the receiver decoder 142 decodes the 10-bit code words "236," "3b1," "232," "1d3," "234," "1d5," "216" and "217" included in the digital signal DBa to the 8-bit code words "f0" through "f7," respectively. Therefore, the receiver decoder 142 is a 10-bit to 8-bit (10B/8B) decoder, but the present disclosure is not limited thereto. In some embodiments, the receiver decoder 142 is configured to decode the digital signals DBa and DBb with N-bit code words into I-bit code words, in which I is a positive integer and I is not equal to N.

Figure 5:
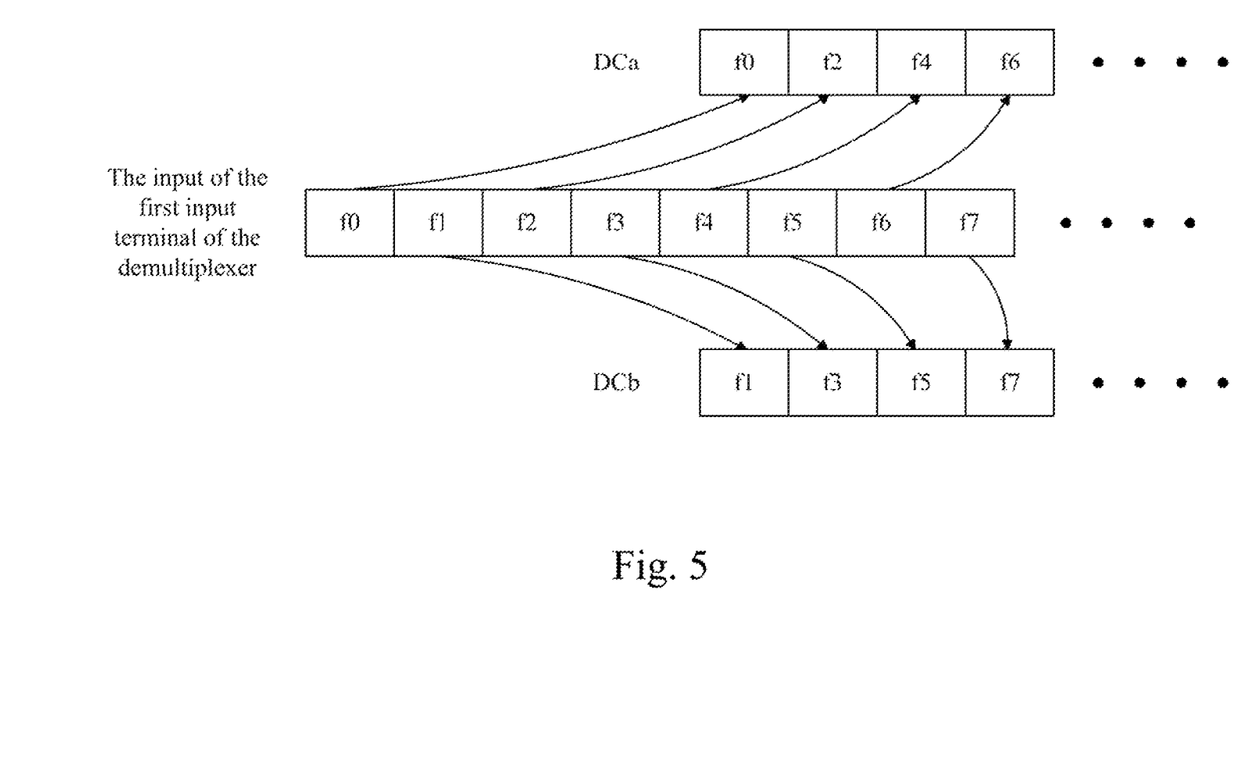
FIG. 5 is a schematic diagram illustrating an operation, executed by a demultiplexer, of alternately deinterleaving code words received from the same input-terminal to different output terminals.

FIG. 5 is a schematic diagram illustrating an operation, executed by a demultiplexer 144, of alternately deinterleaving code words received from the same input-terminal to different output terminals. As shown in FIG. 5, in an arbitrary period of time, the demultiplexer 144 receives the code words "f0" through "f7" in sequence from the first input terminal thereof. The demultiplexer 144 provides the code words "f0," "f2," "f4," and "f6" in sequence through the first output terminal thereof to form the digital signal DCa. Similarly, the demultiplexer 144 provides the code words "f1," "f3," "f5," and "f7" in sequence through the second output terminal thereof to form the digital signal DCb. That is, the adjacent code words are assigned to different output terminals of demultiplexer 144. The demultiplexer 144 generates the digital signals DCc and DCd in a similar way. For the sake of brevity, those descriptions are omitted.

Reference is made again to FIG. 1. In an embodiment, the data rate of the digital signals DAa-DAd can be 4 gigabytes per second (4 Gbps), and the data rate of the digital signals DBa-DBb can be 10 Gbps. That is, the total data rate of the digital signals DAa-DAd is 16 Gbps, the total data rate of the digital signals DBa-DBb is 20 Gbps. As can be appreciated from the foregoing descriptions, the signal transmission system 100 can reduce the number of transmission lines without reducing the data rate, which can further reduce the width of cables (e.g., the cable 150) between electronic apparatus. However, foregoing is only an example, and is not intended to limit the signal data rate, the number of channels, and the number of transmission lines in the present disclosure.

Figure 6:
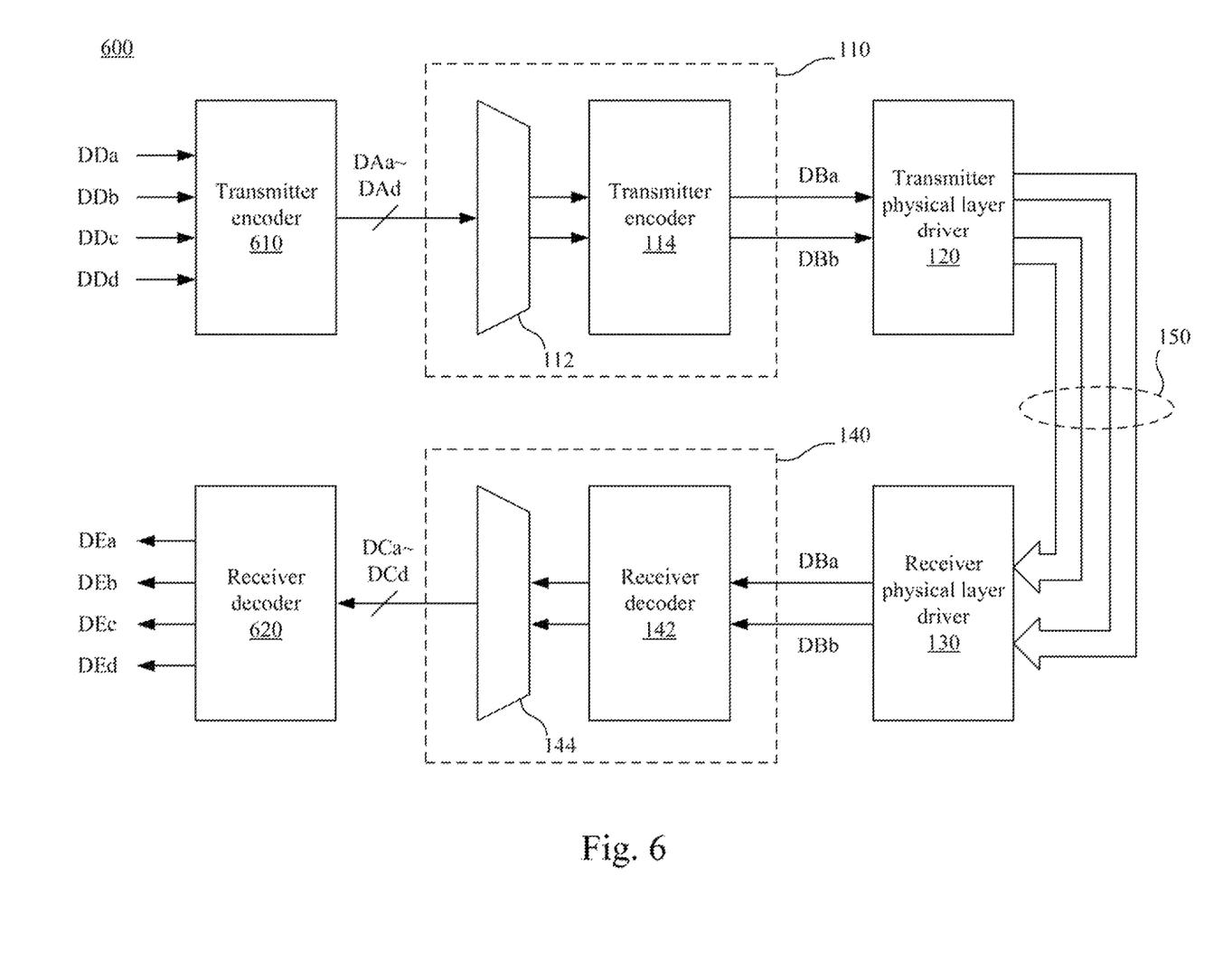
FIG. 6 is a simplified functional block diagram of a signal transmission system according to another embodiment of the present disclosure.

FIG. 6 is a simplified functional block diagram of a signal transmission system 600 according to one embodiment of the present disclosure. The signal transmission system 600 is similar to the signal transmission system 100 of FIG. 1, and the difference is that the signal transmission system 600 further comprises a transmitter encoder 610 and a receiver decoder 620. The transmitter encoder 610 is configured to encode the digital signals DDa-DDd to generate the digital signals DAa-DAd, respectively. In some embodiments, the digital signals DDa-DDd can be video signals, audio signals or other control signals from a multimedia signal source (not shown). On the other hand, the receiver decoder 620 is configured to decode the digital signals DCa-DCd to generate the digital signals DEa-DEd, respectively. In some embodiments, the receiver decoder 620 is configured to provide the digital signals DEa-DEd to a video control IC or an audio control IC (not shown).

In some embodiments, the transmitter encoder 610 is an 8B/10B encoder, and the receiver decoder 620 is a 10B/8B decoder, but the present disclosure is not limited thereto. In other embodiments, the digital signals DAa-DAd are DC-balance signals outputted by the transmitter encoder 610. That is, each of the multiple digital signals DAa-DAd has substantially identical numbers of 1's and 0's.

In general, IC design adopts hierarchical design method, that is, the IC is usually divided into multiple functional blocks designed by multiple teams. In some embodiments, the multimedia signal source and the signal transmission system 600 are designed by different teams, and the multimedia signal source is designed based on the assumption that the generated signal is provided to an encoder. Therefore, the transmitter encoder 610 provides the signal transmission system 600 compatibility with multimedia signal sources. Similarly, the video control IC (or the audio control IC) and the signal transmission system 600 may be designed by different teams. The video control IC or the audio control IC may be designed based on the assumption that it receives the input signal from the decoder. Therefore, the receiver decoder 620 provides the signal transmission system 600 compatibility with the video control IC or the audio control IC.

Figure 7:
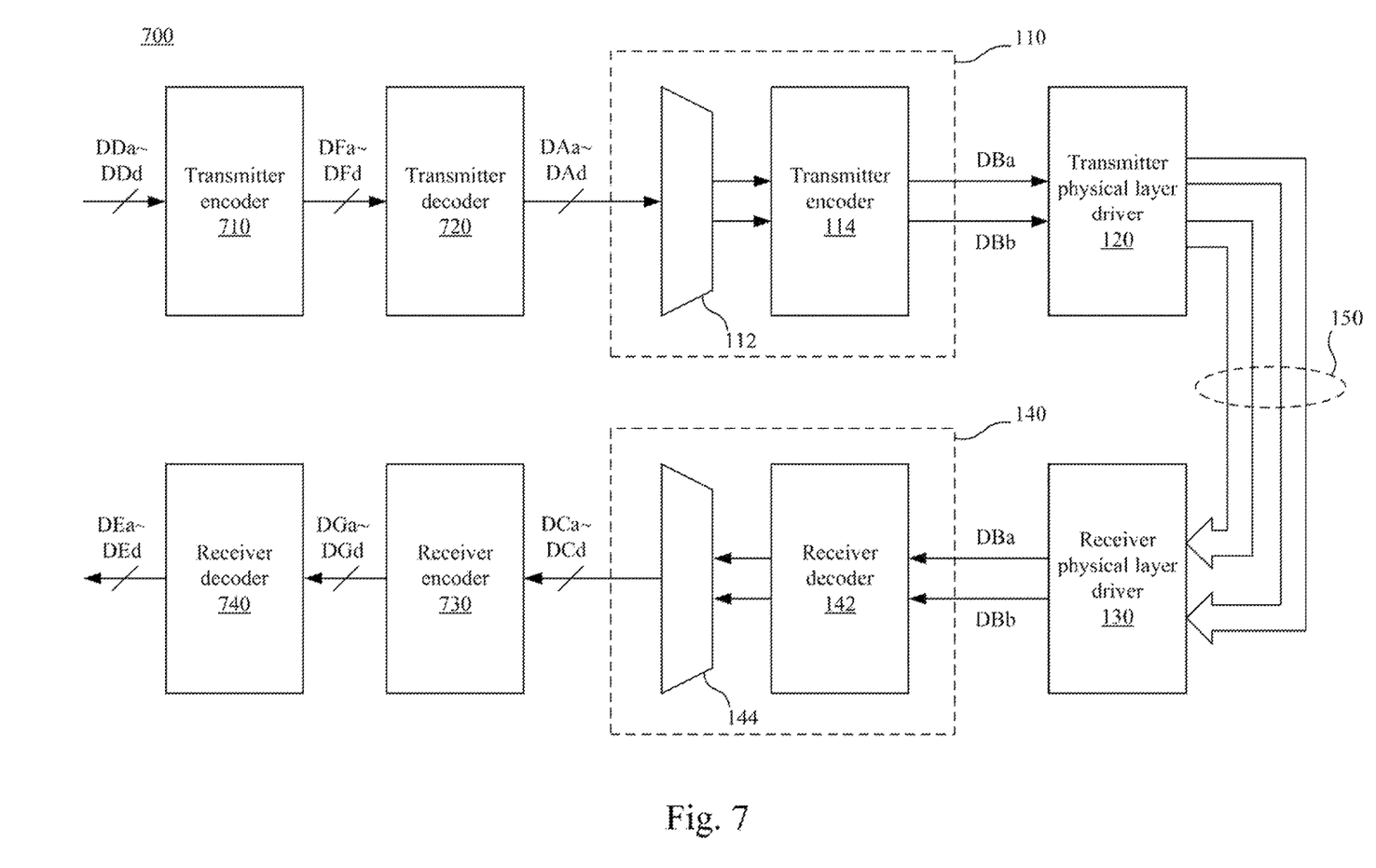
FIG. 7 is a simplified functional block diagram of a signal transmission system according to another embodiment of the present disclosure.

FIG. 7 is a simplified functional block diagram of a signal transmission system 700 according to one embodiment of the present disclosure. The signal transmission system 700 is similar to the signal transmission system 100 of FIG. 1, and the difference is that the signal transmission system 700 further comprises a transmitter encoder 710, a transmitter decoder 720, a receiver encoder 730 and a receiver decoder 740. The transmitter encoder 710 is configured to encode the digital signals DDa-DDd to generate the digital signals DFa-DFd. The transmitter decoder 720 is configured to encode the digital signals DFa-DFd into generate the digital signals DAa-DAd, respectively. In some embodiments, the transmitter encoder 710 is an 8B/10B encoder and the transmitter decoder 720 is a 10B/8B decoder. That is, the encoding/decoding algorithms of the transmitter encoder 710 and the transmitter decoder 720 correspond to each other, but the present disclosure is not limited thereto. In some embodiments, the transmitter encoder 710 is configured to encode the digital signals DDa-DDd with the M-bit code words into digital signals DFa-DFd with the K-bit code words, and the transmitter decoder 720 is configured to decode the digital signals DFa-DFd with the K-bit code words into the digital signals DAa-DAd with the M-bit code words, in which K and M are positive integers and K is not equal to M.

In other embodiments, the digital signals DFa-DFd outputted by the transmitter encoder 710 are DC-balance signals. That is, the digital signals DFa-DFd have substantially identical numbers of 1's and 0's.

The receiver encoder 730 is configured to encode the digital signals DCa-DCd to generate the digital signals DGa-DGd, respectively. The receiver decoder 740 is configured to decode the digital signals DGa-DGd to generate the digital signals DEa-DEd, respectively. In some embodiments, the receiver encoder 730 is an 8B/10B encoder and the receiver decoder 740 is a 10B/8B decoder. That is, the encoding/decoding algorithms of the receiver encoder 730 and the receiver decoder 740 correspond to each other, but the present disclosure is not limited thereto. In some embodiments, the receiver encoder 730 encodes the digital signals DCa-DCd with the I-bit code words to the digital signals DGa-DGd with the J-bit code word, in which I and J are positive integers and I is not equal to J. In other embodiments, the receiver decoder 740 is configured to decode the digital signals DGa-DGd with J-bit code words into the digital signals DEa-DEd with I-bit code words.

In other embodiments, the digital signals DGa-DGd are DC-balance signals outputted from the receiver encoder 730. That is, the digital signals DGa-DGd have substantially identical numbers of 1's and 0's.

Similar to the aforesaid embodiments, the transmitter encoder 710 provides signal transmission system 700 compatibility with multimedia signal sources, and the receiver decoder 740 provides the signal transmission system 700 compatibility with the video control IC and the audio control IC. For the sake of brevity, those descriptions are omitted. Furthermore, the transmitter decoder 720 and the receiver encoder 730 can reduce the minimum bandwidth requirement for the cable 150 in the design.

For example, in one embodiment, the transmitter encoder 114 and the transmitter encoder 710 both are 8B/10B encoders and the transmitter decoder 720 is a 10B/8B decoder, and the data rate of each of the digital signals DDa-DDd is 4 Gbps. In this case, the data rate of each of the digital signals DBa and DBb is 10 Gbps only.

In another embodiment that the transmitter decoder 720 is optionally omitted, the transmitter encoder 114 and transmitter encoder 710 both are 8B/10B encoders and the data rate of each of the digital signals DDa-DDd is 4 Gbps. In this case, the data rate of each of the digital signals DBa and DBb is increased to 12.5 Gbps.

The present disclosure provides multiple embodiments which convert 4 ways of digital signals into 2 ways of digital signals to reduce the number of transmission lines, but the present disclosure is not limited thereto. In practice, the circuit structures of these embodiments can also be applied to convert 8 ways of digital signals into 4 ways of digital signals, or to convert 16 ways of digital signals into 8 ways of digital signals, and so on.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A signal transmission system, comprising:
   a transmitter encoding apparatus comprising:
      a multiplexer, configured to receive a first digital signal and a second digital signal and generate an output, wherein the output of the multiplexer comprises a plurality of M-bit code words of the first digital signal and a plurality of M-bit code words of the second digital signal, wherein the plurality of M-bit code words of the first digital signal and the plurality of M-bit code words of the second digital signal are arranged in an interleaved manner, and M is a positive integer; and
      a first transmitter encoder, configured to encode the output of the multiplexer to generate a plurality of N-bit code words, wherein N is a positive integer and N is not equal to M, wherein the first transmitter encoder is configured to determine a current N-bit code word of the plurality of N-bit code words according to the output of the multiplexer and a disparity of a previous N-bit code word of the plurality of N-bit code words;
   a receiver decoding apparatus, coupled to the transmitter encoding apparatus, comprising:
      a first receiver decoder, configured to decode the plurality of N-bit code words to generate a plurality of I-bit code words, wherein I is a positive integer and I is not equal to N; and
      a demultiplexer, configured to alternately deinterleave and assign the plurality of I-bit code words to a plurality of output terminals of the demultiplexer;
   a second transmitter encoder, configured to output a third digital signal and a fourth digital signal, wherein a plurality of K-bit code words of the third digital signal and the plurality of K-bit code words of the fourth digital signal both have substantially identical numbers of ones and zeros, K is a positive integer, and K is not equal to M; and
   a first transmitter decoder, configured to decode the third digital signal and the fourth digital signal to generate the first digital signal and the second digital signal, respectively.

2. The signal transmission system of claim 1, wherein an encoding algorithm of the second transmitter encoder is an M-bit to K-bit encoding algorithm, and a decoding algorithm of the first transmitter decoder is a K-bit to M-bit decoding algorithm.

3. The signal transmission system of claim 1, further comprising:

a first receiver encoder, configured to encode outputs of the output terminals of the demultiplexer to output a fifth digital signal and a sixth digital signal, wherein a plurality of J-bit code words of the fifth digital signal and a plurality of J-bit code words of the sixth digital signal both have substantially identical numbers of ones and zeros, wherein J is a positive integer and J is not equal to I; and a second receiver decoder, configured to decode the fifth digital signal and the sixth digital signal.

4. The signal transmission system of claim 3, wherein an encoding algorithm of the first receiver encoder is an I-bit to J-bit encoding algorithm, and a decoding algorithm of the second receiver decoder is a J-bit to I-bit decoding algorithm.

5. A receiver decoding apparatus, comprising:

a first receiver decoder, configured to decode a plurality of N-bit code words to generate a plurality of I-bit code words, wherein the plurality of N-bit code words have substantially identical numbers of ones and zeros, wherein N and I are both positive integers and N is not equal to I;

a demultiplexer, configured to alternately deinterleave and assign the plurality of I-bit code words to a plurality of output terminals of the demultiplexer, wherein the first receiver decoder is configured to receive the plurality of N-bit code words from a transmitter encoding apparatus comprising a multiplexer and a first transmitter encoder configured to generate the plurality of N-bit code words;

a first receiver encoder, configured to encode a plurality of outputs of the output terminals of the demultiplexer to a fifth digital signal and a sixth digital signal, wherein a plurality of J-bit code words of the fifth digital signal and a plurality of J-bit code words of the sixth digital signal both have substantially identical numbers of ones and zeros, wherein J is a positive integer and J is not equal to I; and a second receiver decoder, configured to decode the fifth digital signal and the sixth digital signal.

6. The receiver decoding apparatus of claim 5, wherein an encoding algorithm of the first receiver encoder is an I-bit to J-bit encoding algorithm, and a decoding algorithm of the second receiver decoder is a J-bit to I-bit decoding algorithm.

* * * * *